United States Patent [19]

Hasegawa et al.

[11] Patent Number: 4,832,984

[45] Date of Patent: May 23, 1989

[54] IMAGE FORMING METHOD

[75] Inventors: Kenji Hasegawa, Isehara; Masahiko Higuma, Sagamihara; Mamoru Sakaki, Sagamihara; Ryuichi Arai, Sagamihara; Takashi Akiya, Yokohama; Naoya Morohoshi, Numazu, all of Japan

[73] Assignee: Canon Kabushiki Kaisha, Tokyo, Japan

[21] Appl. No.: 229,730

[22] Filed: Aug. 2, 1988

Related U.S. Application Data

[63] Continuation of Ser. No. 10,482, Feb. 3, 1987, abandoned.

[30] Foreign Application Priority Data

| | | | |
|---|---|---|---|
| Feb. 7, 1986 | [JP] | Japan | 61-26463 |
| Feb. 24, 1986 | [JP] | Japan | 61-37344 |
| May 21, 1986 | [JP] | Japan | 61-114829 |

[51] Int. Cl.$^4$ .......... B05B 5/00; G01D 9/00

[52] U.S. Cl. .......... 427/161; 346/1.1; 346/135.1

[58] Field of Search .......... 346/1.1, 635.1; 427/161

[56] References Cited

U.S. PATENT DOCUMENTS

| | | | |
|---|---|---|---|
| 4,252,601 | 2/1981 | Ceintrey | 427/161 X |
| 4,503,118 | 3/1985 | Murakami et al. | 346/135.1 X |
| 4,547,405 | 10/1985 | Bedell et al. | 346/135.1 X |
| 4,649,064 | 3/1987 | Jones | 346/135.1 X |
| 4,785,313 | 11/1988 | Higuma et al. | 346/135.1 |

FOREIGN PATENT DOCUMENTS

| | | |
|---|---|---|
| 0049040 | 4/1982 | European Pat. Off. . |

*Primary Examiner*—Michael Lusignan
*Attorney, Agent, or Firm*—Fitzpatrick, Cella, Harper & Scinto

[57] ABSTRACT

This invention relates to a method for forming an image, comprising a step of applying ink to a recording medium having a light-transmissive ink retaining layer and a light-diffusing ink transporting layer on a substrate to form an image through said ink transporting layer in said ink retaining layer and a step of transparentizing said ink transporting layer.

51 Claims, No Drawings

IMAGE FORMING METHOD

This application is a continuation of application Ser. No. 010,482 filed Feb. 3, 1987, now abandoned.

BACKGROUND OF THE INVENTION

1. Field of the Invention

This invention relates to an image forming method using ink such as image formation with a felt pen, a fountain pen, a pen plotter, an ink jet recording device, etc., particularly an image forming method for obtaining a recorded image of high image quality excellent in light transmittance or gloss, and also excellent in color characteristic, resolution, water resistance, light resistance, storability, etc.

2. Description of the Related Art

Heretofore, the image forming method using ink may include, for example, writing with a fountain pen, a felt pen, a ball pen, etc., and an image forming method by a pen plotter, an ink jet recording device, etc., and the recording medium for these image forming methods may include general paper such as pure paper, bond paper, writing paper, etc., or coated paper such as art paper, cast-coated paper, etc.

On the other hand, as the ink used for the image forming method as mentioned above, aqueous ink is primarily used, and in forming a multi-color image, at least three kinds of aqueous inks of cyan, magenta and yellow have been used in most cases.

However, in recent years, with development of recording instruments such as ink jet recording devices, pen plotters, etc., satisfactory recording characteristic cannot be obtained with the recording medium of the prior art as mentioned above.

Recent image forming methods as mentioned above conduct higher speed recording and multi-color recording which could not be practiced in the past. Accordingly, with the recording medium of the prior art, absorptivity of ink, color forming characteristic with plural inks applied on the same spot, color characteristic, etc. have not reached satisfactory levels yet.

For solving these problems, a kind of coated paper comprising a porous ink absorbing layer on the substrate surface as typified by ink-jet recording paper has been developed. For example, Japanese Laid-open Patent Publication No. 214989/1985 discloses a sheet comprising a porous ink-absorbing resin layer provided on a substrate.

This ink-absorbing layer is porous and includes fine pores or cracks therein, which accelerate ink absorption.

Although a porous ink absorbing layer can enhance ink absorption to some extent, the recording medium has light diffusivity owing to the porocity of the absorbing layer, thereby giving, no clear recorded image with high optical density or recorded image with gloss.

For observation of the recorded ink image from the recorded side, there is adopted the constitution of the medium which permits the recording agent (dye or pigment, hereinafter simply called dye) to remain on the surface of the absorbing layer as much as possible, which leads to the drawback that the image is inferior in durability such as in water resistance, frictional resistance and storability.

As a method for solving such problems, Japanese Laid-open Patent Publication No. 27426/1978, for example, discloses a recording material with a recording layer formed by fixing thermoplastic resin particles on the surface of a sheet substrate and baking thermally the recording layer after recording to give the surface gloss and also enhance frictional resistance, water resistance, light resistance, storability, etc. This recording material can solve most of the drawbacks as mentioned above, but in the method using this recording material, the image is liable to be disturbed to lose its fineness especially in fine images because the image is formed in the recording medium which is later softened or melted on the subsequent heating treatment. Japanese Laid-open Patent Publication No. 77154/1981 discloses a method in which recording is effected on a recording sheet having a porous structure as described above and then the voids of the porous structure are filled with another material. This method can solve various drawbacks as mentioned above, but because a liquid material such as a resin solution, etc., is used as a filler, another drawback arises that the operations are cumbersome. Moreover, since the image is formed in the porous layer to which the liquid material is directly applied, the dye forming an image may be dissolved, feathered or flowed to cause disturbance of the image, ensuing the problem that fineness is impaired in the case of a fine image formation as described above.

Therefore, an image forming method is desired which is free from such problems yet exhibits excellent ink absorption ability, water resistance, anti-blocking property, etc., during recording and which can provide invariably images having excellent quality such as light transmittance or gloss, color characteristic, high image density, resolution, water resistance, light resistance, storability, etc.

Nevertheless, no image forming method having all of these recording characteristics at the same time has been obtained yet.

SUMMARY OF THE INVENTION

An object of the present invention is to provide an image forming method for obtaining excellent images having appropriate gloss on the surface, and also having excellent optical density, resolution, water resistance, light resistance, anti-blocking property, storability, etc.

Another object of the present invention is to provide a method for preparing a light-transmissive printed matter having satisfactory transparency and also having excellent optical density, resolution, water resistance, light resistance and storability.

Still another object of the present invention is to provide a method for forming an image excellent in storability which is free from peel-off between the substrate and a ink retaining layer at the ink recording portion.

According to an aspect of the present invention, there is provided a method for forming image, comprising a step of applying ink to a recording medium having an ink retaining layer and an ink transporting layer on a substrate, and a step of transparentizing said ink transporting layer.

According to another aspect of the present invention, there is provided a method for forming an image for observation with transmitted light, comprising a step of applying ink to a recording medium having a light-transmissive ink retaining layer and an ink transporting layer on a light-transmissive substrate, and a step of transparentizing said ink transporting layer.

According to a further aspect of the present invention, there is provided a method for forming an image with surface gloss, comprising a step of applying ink to a recording medium having a light-transmissive ink retaining layer and an ink transporting layer on a light-intransmissive substrate, and a step of transparentizing said ink transporting layer.

DETAILED DESCRIPTION OF THE PREFERRED EMBODIMENTS

The present invention will be described in more detail. The present inventors proposed formerly a recording medium having an ink transporting layer and an ink retaining layer, and it has now been found that various problems of the prior art as described above can be solve all at once by recording on the recording material and then subject it to an appropriate after-treatment to obtain an image excellent in light transmittance or gloss, frictional resistance, water resistance, light resistance, storability, etc.

In the present invention, as described in detail below, the image forming portion is constituted of two layers. The surface layer thereof, namely the ink transporting layer to which ink is applied, is made to absorb the ink well but does not retain ink (or the dye contained therein) by adsorption. An ink retaining layer which forms an image by retaining permanently the dye in the ink transported from the ink transporting layer is formed under the surface layer. By performing recording by using such a recording medium, and by transparentizing the ink transporting layer of the recorded product by any desired means such as filling of a resin solution or heat treatment, it has been found that an image of high quality can be obtained without impairing the image formed at all.

In the prior art, since the image is formed in the porous layer in which a filler is filled or the porous layer itself which is subjected to heating treatment, the image was impaired by these treatments. On the other hand, in the present invention, substantially no image (dye) exists in the ink transporting layer which is treated after recording, but the image exists in the ink retaining layer therebeneath, so that the image existing in the ink retaining layer will not be impaired at all even if any treatment may be made on the ink transporting layer after recording, but good light transmittance or gloss, frictional resistance, water resistance, light resistance, storability, etc., could be easily given to the recorded product as a whole while maintaining good resolution, etc., at the recording.

The recording medium to be used in the present invention has basically an ink transporting layer on the ink application side, and is also provided with an ink retaining layer adjacent thereto.

The above ink transporting layer has liquid permeability, having the function of rapidly absorbing and permeating the applied ink substantially without being dyed by the ink, while the ink retaining layer has the function of absorbing and retaining ink or dye migrated from said ink transporting layer.

In this case, the ink transporting layer has a high affinity for the liquid medium in the ink, but contrariwise low affinity for the dye.

Accordingly, the ink transporting layer must be constituted of a selected material which has the characteristics of wetting, penetration, diffusion, etc., for the liquid medium for the ink, but has no characteristic of adsorption, penetration, reaction, etc., for the dye.

Also, the above ink retaining layer must have stronger absorbing power than the ink transporting layer in order to stably absorb and capture the ink temporarily absorbed by the ink transporting layer.

Therefore, the ink retaining layer must have also high affinity for the dye similarly as for the liquid medium in the ink.

In the following, based on preferred embodiments, the recording medium to be used in the present invention is described in more detail.

The recording medium to be used in the present invention is constituted of a substrate as the supporting member, an ink retaining layer formed on said substrate which substantially absorbs and captures ink or dye, and an ink transporting layer formed on the ink retaining layer which receives directly the ink, has liquid permeability and will not substantially permit the dye to remain therein.

However, when the ink transporting layer or the ink retaining layer has the function as the substrate as well, the substrate is not necessarily required.

As the substrate to be used for the above recording medium, either transparent or opaque material known in the art can be used. Specifically, there may be employed plastic films, plastic plates, etc., such as of a polyester resin, a diacetate resin, a triacetate resin, a polystyrene resin, a polyethylene resin, a polycarbonate resin, a polymethacrylate resin, cellophane, celluloid, a polyvinyl chloride resin, a polyvinylidene chloride resin, a polysulfone resin, a polyimide resin, etc., or these materials which have been subjected to opacifying treatment such as white or other colored materials, papers, converted paper or glass plates, etc. The thickness of these substrate is not particularly limited, but it is generally about 1 μm to 5000 μm.

The substrate to be employed may be subjected to any desired processing. For example, the substrate can be applied with a desired pattern, an appropriate degree of gloss or a silky texture. Further, by selecting a substrate having water resistance, frictional resistance, etc., water resistance or frictional resistance can be also given to the recording medium.

The ink transporting layer constituting the recording medium to be used in the present invention is required to have at least liquid permeability. The liquid permeability as mentioned in the present invention refers to the property which permits ink to pass rapidly therethrough and will not substantially permit the dye in the ink to remain in the ink transporting layer. A preferred embodiment for improving the liquid permeability of the ink transporting layer is one having a porous structure having cracks or communicated pores within the ink transporting layer.

The ink transporting layer having the above characteristics may have any constitution, provided that it has the above characteristics, but may be preferably constituted primary of particles and a binder which are not dyeable with the dye.

As such particles, any kind of particles which will not substantially adsorb the dye in the ink may be useful, and particularly preferable particles in the recording medium to be used in the present invention, because the dye in the ink is generally water-soluble, may include organic particles o highly hydrophobic thermoplastic resins, thermosetting resins, etc., such as resin powders of polystyrene, polymethacrylate, elastomer, ethylene-vinyl acetate copolymers, styreneacrylic copolymers, polyesters, polyacrylates, polyvinyl ethers, polyamides, polyolefins, fluorine resins, polyacetals, polyamidoimides, ionomers, polyurethanes, melamine resins, urea resins, phenol resins, guanamine resins, SBR, chloroprene, etc., their emulsions or suspensions, of which at least one kind may be used as desired. The ink transporting layer formed from such particles is generally opaque to translucent. These ink transporting layers may also contain inorganic pigments such as talc, calcium carbonate, calcium sulfate, magnesium hydroxide, basic magnesium carbonate, alumina, synthetic silica, calcium silicate, diatomaceous earth, aluminum hydroxide, clay, barium sulfate, titanium oxide, zinc oxide, zinc sulfide, satin white, silicon oxide, lithopone, etc., in a minute amount to such an extent that the pigment will not obstruct its ink permeability and the layer does not become opaque after the subsequent transparentizing treatment.

On the other hand, the binder to be used has the function of binding mutually the above particles and/or the ink retaining layer, and is preferably not dyeable with the dye similarly as the above particles.

As a preferable material for the binder, any material known in the art can be used, provided that it has the function as mentioned above, including polyvinyl alcohol, acrylic resins, styrene-acrylic copolymers, polyvinyl acetates, ethylene-vinyl acetate copolymers, starch, polyvinylbutyrals, gelatin, casein, ionomers, gum arabic, carboxymethyl cellulose, polyvinylpyrrolidone, polyacrylamides, polyurethanes, melamine resins, epoxy resins, styrene-butadiene rubbers, urea resins, phenol resins, α-olefin resins, chloroprene, nitrile rubbers, polyvinylidene chloride, acrylic-vinyl acetate copolymers, xylene resins, coumarone resins, ketone resins, polyethylene oxides, polyvinyl ethers, etc., of which at least one resin can be used as desired. When the above ink transporting layer is transparentized by heating, at least one of the particles and binder as described above is preferably made of a thermoplastic material.

Further, for improving the above function as the ink transporting layer, various additives such as surfactants, penetrating agents, fluorescent dyes, coloring dyes, etc., may be also added in the ink transporting layer, if desired.

The mixing ratio (weight ratio) of the above particles and a binder may be preferably within the range of particle/binder=1/5 to 50/1, more preferably 3/1 to 20/1. When the binder is contained more than in this mixing ratio, cracks or communicated pores in the transporting layer are reduced, whereby the absorbing effect of ink will be reduced. On the other hand, if the particles are contained more than in the mixing ratio, adhesion between the particles or between the ink retaining layer and the particles becomes insufficient, whereby the strength of the ink transporting layer becomes in sufficient, and also the ink transporting layer cannot be formed.

The thickness of the ink transporting layer, which will also depend on the quantity of the ink droplets, may be 1 to 400 μm, preferably 2 to 200 μm, more preferably 3 to 100 μm.

The non-porous ink-retaining layer which substantially captures ink or dye will absorb, capture and retain substantially permanently the dye in the ink which has passed through the ink transporting layer.

The ink retaining layer is required to have higher absorbing power for the ink than the ink transporting layer. This is because, if the ink retaining layer has less absorbing power than the ink transporting layer, the ink applied to the surface of the ink-transporting layer will remain staying in the ink-transporting layer after the ink travels through the ink-transporting layer and the leading edge of the ink reaches the ink retaining layer, whereby the ink will be penetrated and diffused at the interface between the ink transporting layer and the ink retaining layer through the ink transporting layer more in the lateral direction than is necessary. As a consequence, the recorded image is lowered in resolution, whereby no recorded image of high quality can be formed.

The ink retaining layer satisfying the above requirement should be preferably constituted of a resin which can absorb the dye and/or a resin having solubility or swelling characteristic in the ink.

For example, when an aqueous ink containing an acid dye or a direct dye is used as the dye, the ink retaining layer should be constituted of a resin having adsorptivity for the above dye, for example, water-soluble or hydrophilic polymer having swellability with the aqueous ink. Examples of such water-soluble or hydrophilic polymers may include natural resins such as albumin, gelatin, casein, starch, cationic starch, gum arabic, sodium alginate, etc., synthetic resins such as carboxymethyl cellulose, hydroxyethyl cellulose, polyamide, polyacrylamide, polyethyleneimine, polyvinylpyrrolidone, quaternarized polyvinylpyrrolidone, polyvinylpyridinium halide, melamine resins, phenol resins, alkyd resins, polyurethane, polyvinyl alcohol, ion-modified polyvinyl alcohol, polyester, sodium polyacrylate, etc., preferably hydrophilic polymers which were made water-insoluble by crosslinking treatment of these polymers, hydrophilic and water-insoluble complex comprising two or more kinds of polymers, hydrophilic and water-insoluble polymers having hydrophilic segments, etc.

Among these hydrophilic or water-soluble polymers, particularly hydrophilic but water-insoluble polymers are extremely useful. By forming the ink retaining layer of such polymer, the ink retaining property is satisfactory and high adhesive forces are exhibited to both the substrate and the porous transporting layer existing above and below the ink retaining layer, and also it has been found also in the case of the ink retaining layer retaining an aqueous ink that there will ensue no problem of interlayer peel-off therebetween.

Such water-insoluble polymers are not general hydrophobic polymers having no hydrophilic property at all, but polymers which are insoluble in water but has sufficient hydrophilic property. Specific examples of such hydrophilic and water-insoluble polymers are set forth below.

(1) Block copolymers or graft copolymers having hydrophilic segments and hydrophobic segments in the molecule:

Such block copolymers or graft copolymers are water-insoluble as a whole, but are hydrophilic. The hydrophilic segments of such polymers are, for example, segments of polymers of two or more vinyl monomers having hydrophilic groups such as carboxyl group, sulfonic acid group, hydroxyl group, ether group, acid amide group, methylolated group thereof, primary to tertiary amino group, quaternary ammonium group, etc., and examples of such hydrophilic monomers may include (meth)acrylic acid, maleic anhydride, vinylsulfonic acid, sulfonated styrene, vinyl acetate, mono(meth)acrylate or monomaleate of a polyol such as ethylene glycol, etc., (meth)acrylic acid amide or methylolated product thereof, mono or dialkylaminoethyl (meth)acrylate, quaternarized products of these, vinylpyrrolidone, vinylpyridine, etc.

Hydrophobic polymer segments are polymers of two or more monomers, including olefins such as ethylene, propylene, butylene, etc., aromatic vinyl compounds such as styrene, methylstyrene, vinylnaphthalene, etc., halogenated olefins such as vinyl chloride, vinylidene chloride, vinylidene fluoride, etc., various kinds of alcohol esters of (meth)acrylic acid, crotonic acid and other unsaturated carboxylic acids.

Also, water-soluble polymers other than those mentioned above, for example, natural resins such as albumin, gelatin, casein, starch, cationic starch, gum arabic, sodium alginate, etc., hydrophilic natural or synthetic polymers such as polyvinyl alcohol, polyamide, polyacrylamide, polyvinylpyrrolidone, polyethyleneimine, polyvinylpyridinium halide, melamine resins, polyurethane, polyester, sodium polyacrylate, etc., or hydrophilic natural or synthetic polymers obtained by modifying these to water-insoluble can be also used as the hydrophilic polymer segments or hydrophobic polymer segments as a matter of course.

(2) Crosslinked products of water-soluble polymers:

These are obtained by crosslinking various water-soluble polymers as mentioned above and described below with a crosslinking agent or a radiation to the extent which will not lose hydrophilic property but becomes water-insoluble.

(3) Polymer complex comprising an acidic polymer and a basic polymer:

Such a polymer complex comprises a basic polymer and an acidic polymer, which in itself is already known, for example, in Japanese Patent Publications No. 37017/1976 and No. 42744/1980.

Examples of preferable basic polymers for formation of such polymer complex may include:

homopolymers of N-vinylpyrrolidone, N-vinyl-3-methylpyrrolidone, N-vinyl-5-methylpyrrolidone, N-vinyl-3,3,5-trimethylpyrrolidone, N-vinyl-3-benzylpyrrolidone, N-vinylpiperidone, N-vinyl-4-methylpiperidone, N-vinyl-caprolactam, N-vinylcapryllactam, N-vinyl-3-morpholine, N-vinylthiopyrrolidone, N-vinyl-2-pyridone, etc. or random copolymers, block copolymers and graft copolymers with other monomers in general;

homopolymers of N-vinyl-2-oxazolidone, N-vinyl-5-methyl-2-oxazolidone, N-vinyl-5-ethyl-2-oxazolidone, N-vinyl-4-methyl-2-oxazolidone, N-vinyl-2-thiooxazolidone, N-vinyl-2-mercaptobenzothiazole, etc., or random copolymers, block copolymers and graft copolymers with other monomers in general;

homopolymers of N-vinylimidazole, N-vinyl-2-methylimidazole, N-vinyl-4-methylimidazole, etc., or random copolymers, block copolymrs and graft copolymers with other monomers in general;

homopolymers of 2- or 4-vinylpyridine, etc., or other random copolymers, block copolymers and graft copolymers with other monomers in general, and other copolymerizable monomers which can be used in the above copolymers are monomers in general such as methacrylate, acrylate, acrylamide, acrylonitrile, vinyl ether, vinyl acetate, vinylimidazole, ethylene, styrene and others.

Particularly useful are homopolymers and copolymers of N-vinylpyrrolidone, N-vinylpiperidone, N-vinylcaprolactam, N-vinylmorpholine, N-vinyl-2-oxazolidone, N-vinyl-5-methyl-2-oxazolidone. In copolymers, the nitrogen containing monomer as mentioned above may preferably be included at a proportion of 50 mol % or more.

On the other hand, the acidic polymer capable of forming a polymer complex with the above basic polymer (the "acidic polymer" in the present invention is also inclusive of those having sulfonic acid groups, carboxylic acid groups, sulfate ester groups, phosphate ester groups, phenolic hydroxyl groups as well as those having alcoholic hydroxyl groups in the molecule) may include those as mentioned below.

1. Polymers having carboxylic group:

Carboxyl-terminated polyesters obtained by the reaction of polyvalent carboxylic acids such as citric acid, tartaric acid, phthalic acid, etc., with polyhydric alcohols such as ethylene glycol, 1,4-butanediol, diethylene glycol, etc., in excess of the acid;

Acidic cellulose derivatives modified with various polyvalent carboxylic acids (see Japanese Patent Publication No. 5093/1960);

Homopolymers of vinylether ester monomers of polyvalent carboxylic acids or random copolymers, block copolymers, graft copolymers with other monomers in general (see Japanese Patent Publication No. 8495/1960);

Homopolymers of monomers such as acrylic acid or methacrylic acid, etc., or random copolymers, block copolymers and graft copolymers with other monomers in general;

Homopolymers of $\alpha,\beta$-unsaturated vinyl monomers such as maleic anhydride, itaconic acid, etc., or random copolymers, block copolymers and graft copolymers with other monomers in general [see "Gosei Kobunshi (III) (Synthetic Polymer (III)", edited by Murahashi, Inoue, and Tani, p.250–257 and p.374–380, Asakura Shoten, 1971].

2. Polymers having sulfonic acid groups:

Cellulose derivatives such as o-ethyl cellulose acetate hydrogen sulfate hydrogen phthalate, cellulose acetate hydrogen sulfate hydrogen phthalate, ethyl cellulose hydrogen-o-sulfobenzoate, o-p-sulfobenzyl cellulose acetate, o-ethyl-o-p-sulfoethyl cellulose acetate, etc. (see Japanese Patent Publication No. 5093/1960);

Sulfonic acid modified polymers of polyvinyl alcohol or vinyl alcohol copolymers with sulfonic acid compound (e.g. o-sulfobenzoic acid, sulfopropionic acid, sulfovaleric acid, sulfobenzaldehyde, sulfophthalic acid, etc.

3. Polymers having hydroxyl group:

Ethyl cellulose, benzyl cellulose, hydroxyethyl cellulose, hydroxyethyl/ethyl cellulose, hydroxyethyl/benzyl cellulose, etc.;

Other homopolymers of monomers containing sulfonic acid or phenol groups or random copolymers, block copolymers and graft copolymers with other monomers in general;

Other modified acidic products of various polymers with compounds containing carboxylic groups or sulfonic acid groups or phenolic groups.

As the preferable basic polymer and the acidic polymer for forming the polymer complex as described above, those having molecular weights of 500 or higher, preferably 1000 or higher, may be respectively used and by use of both polymers having these molecular weights, an ink receiving layer can be formed which has great strength and excellent ink receptivity, clearness of image and water resistance.

The proportions of the both polymers used may be within the range from 20/1 to 1/10 in terms of weight ratio of basic polymer/acidic polymer.

Also, in the present invention, in addition to the water-insoluble polymers as mentioned above, for example, water-soluble or hydrophilic polymers as mentioned above can be used in combination.

Further, for reinforcing the ink retaining layer and/or further improving adhesion between the substrate and the ink absorbing layer, if desired, hydrophobic resins such as SBR latex, NBR latex, polyvinyl formal, polymethyl methacrylate polyvinyl butyral, polyacrylonitrile, polyvinyl chloride, polyvinyl acetate, phenol resins, alkyd resins, etc. can also be used in combination within the range which does not obstruct the object of the present invention.

The ink retaining layer formed of the materials as mentioned above may also contain the inorganic pigment as mentioned above to enhance ink absorptivity within the range which does not obstruct its light transmittance.

The thickness of the ink retaining layer is made sufficient to absorb and capture the ink, which may differ also depending on the ink droplet amount, but may be 1 to 200 μm, preferably 1 to 50 μm, more preferably 3 to 20 μm.

As the method for forming the ink retaining layer and the ink transporting layer on the substrate, the preferable materials as mentioned above may be dissolved or dispersed in an appropriate solvent to prepare a coating liquid, and said coating liquid is coated on the substrate according to a known method such as roll coating, rod bar coating, spray coating, airknife coating, etc., followed by rapid drying. It is also possible to apply the above materials according to the hot melt coating method or alternatively to form once a single sheet from the above materials and laminate said sheet onto the material.

However, when an ink retaining layer is provided on the substrate, it is preferable to remove the space by consolidating adhesion between the substrate and the ink retaining layer according to such a method as forming an anchor coating layer.

If a space exists between the substrate and the ink retaining layer, the observed surface of the recorded image will cause diffused reflection, whereby substantially the image optical density will undesirably lowered.

In the recording method of the present invention, the ink applied for image formation onto a specific recording medium as described above may be itself known such as water-soluble dyes as represented by direct dyes acidic dyes, basic dyes, reactive dyes, food dyes, etc. Particularly, preferable examples suitable as the ink for the ink jet system which is sufficient in performances such as fixability, color forming characteristic, clearness, stability, light resistance and other requisite performances in combination with the above recording medium may include, for example, direct dyes such as C.I. Direct Black 17, 19, 32, 51, 71, 108, 146
C.I. Direct Blue 6, 22, 25, 71, 86, 90, 106, 199
C.I. Direct Red 1, 4, 17, 28, 83
C.I. Direct Yellow 12, 24, 26, 86, 98, 142
C.I. Direct Orange 34, 39, 44, 46, 60
C.I. Direct Violet 47, 48
C.I. Direct Brown 109
C.I. Direct Green 59, etc.; acidic dyes such as
C.I. Acid Black 2, 7, 24, 26, 31, 52, 63, 112, 118
C.I. Acid Blue 9, 22, 40, 59, 93, 102, 104, 113, 117, 120, 167, 229, 234
C.I. Acid Red 1, 6, 32, 37, 51, 52, 80, 85, 87, 92, 94, 115, 180, 256, 317, 315
C.I. Acid Yellow 11, 17, 23, 25, 29, 42, 61, 71
C.I. Acid Orange 7, 19
C.I. Acid Violet 49, etc.; or otherwise C.I. Basic Black 2
C.I. Basic Blue 1, 3, 5, 7, 9, 24, 25, 26, 28, 29
C.I. Basic Red 1, 2, 9, 12, 13, 14, 37
C.I. Basic Violet 7, 14, 27
C.I. Food Black 1, 2, etc., may be also available.

The above examples of dyes are particularly preferable for the ink applicable for the recording method of the present invention, but the dyes for ink to be used in the present invention are not limited to these dyes.

Such water-soluble dyes is used generally at a proportion of about 0.1 to 20 wt. % in the ink of the prior art, and this proportion may be also applicable in the present invention.

A preferable solvent to be used in the ink for the present invention is water or a solvent mixture of water with a water-soluble organic solvent, particularly preferably a solvent mixture of water with a water-soluble organic solvent, containing a polyhydric alcohol having the drying preventive effect of ink as the water-soluble organic solvent. Also, as the water, it is preferable to use deionized water in place of common water containing various ions. As the water-soluble organic solvents to be used as a mixture with water, there may be included, for example, alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol, isobutyl alcohol, etc.; amides such as dimethylformamide, dimethylacetamide, etc.; ketones or ketoalcohols such as acetone, diacetone alcohol, etc.; ethers such as tetrahydrofuran, dioxane, etc.; polyalkyleneglycols such as polyethyleneglycol, polypropyleneglycol, etc.; alkylene glycols of which alkylene group contains 2 to 6 carbon atoms such as ethylene glycol, propylene glycol, butylene glycol, triethylene glycol, 1,2,6-hexanetriol, thiodiglycol, hexylene glycol, diethylene glycol, etc.; glycerine; lower alkyl ethers of polyhydric alcohols such as ethylene glycol methyl (or ethyl) ether, diethylene glycol methyl (or ethyl) ether, triethylene glycol monomethyl (or ethyl) ether, etc.; N-methyl-2-pyrrolidone, 1,3-dimethyl-2-imidazolidinone, etc. Among these many water-soluble organic solvents, polyhydric alcohols such as diethylene glycol, etc., lower alkyl ethers of polyhydric alcohols such as triethylene glycol monomethyl (or ethyl) ether, etc., are preferred.

The content of the above water-soluble organic solvent in the ink may be 0 to 95 wt. % based on the total weight of the ink, preferably 10 to 80 wt. %, more preferably 20 to 50 wt. %.

Also, the ink to be used in the present invention can optionally include other components than those as mentioned above such as surfactants, viscosity controllers, surface tension controllers, etc.

As the method for performing recording by applying the above ink to the specific recording medium in the method of the present invention, any method may be available, but the ink jet system is preferable from the standpoint of high speed in image formation.

In forming an image according to the method as mentioned above, when the image after the transparentizing treatment of the ink transporting layer shown below is to be observed from the ink retaining layer side or the substrate side, the images observed are in a relationship of mirror images, and therefore it is required that particularly the letters, etc., should be printed as the mirror-reflected image, etc.

The second principal specific feature of the present invention resides in performing the transparentizing treatment of the ink transporting layer after formation of an image according to the recording method as described below with an aqueous ink as described above.

The ink transporting layer is porous as described above, and therefore has no gloss and the water tends to disturb the image in the ink retaining layer when water is attached or moisture is penetrated thereinto. Also, since it is also gas-permeable as a matter of course, the image may be decolored or faded by penetration of oxidizing gas or reducing gas in the air. Further, caused by the porous nature, frictional resistance, etc., is also insufficient. Such problems have been solved according to the present invention without lowering the quality of the image formed at all. That is, in conventional methods, since an image is formed on the recorded portion which is to be transparentized, the recorded image is disturbed by the transparentizing treatment, but in the present invention, since the recording medium used has an ink transporting layer and an ink retaining layer, and the image exists in the ink retaining layer and substantially no image exists in the ink transporting layer to be transparentized, whereby the image will not be deteriorated at all if the clarifying treatment is effected sufficiently.

As the method for transparentizing the ink transporting layer, there may be employed various methods such as heating, pressurization, solvent or plasticizer treatment, etc.

For example, when the ink transporting layer contains a thermoplastic material, any of the methods by hot presses, hot rolls, hot air, IR-ray irradiation, high frequency heating, etc., can be utilized. The temperature used may be preferably a temperature at which the thermoplastic material is softened or melted, for example, about 50° C. to 200° C., and the heating time is not particularly limited. By this heat treatment, the ink transporting layer is transparentized and the image can be observed from its surface. Also, when a small amount of a pigment is contained, a visual feeling of matte state is given. Another preferable method is to apply a resin solution, a curable resin solution or volatile material solution, etc., to the ink transporting layer, followed by drying and curing, thereby effecting transparentization. Any material which can sufficiently seal the pores of the ink transporting layer can be used. The applying conditions, for example, applied amount, applying temperature, drying and curing conditions may be various conditions used in the prior art in the field of various coating materials.

As the clarifying methods, otherwise there may be employed the method in which the resin particles in the ink transporting layer are fused, the method in which the resin particles are dissolved and uniformized, etc., and either method is preferable for the present invention.

Through such a treatment, the recording medium having the recorded image becomes sufficiently light-transmittance and/or gets surface gloss.

As the sufficient light transmittance as mentioned in the present invention, it is desirable that the linear transmittance of the recording medium exhibits at least 2%, preferably 10% or higher.

If the linear transmittance is 2% or higher, it is possible to observe the recorded image by projecting it onto a screen by, for example, OHP, and further the linear transmittance should desirably be 10% or higher for clear observation of the fine portion of the recorded image.

The linear transmittance T (%) as herein mentioned is a value determined by measuring the spectral transmittance of a linear light which is projected vertically onto the sample, transmits through the sample, passes through a slit on the light receiving side existing on the extended line of the incident light pathway which is apart by at least 8 cm from the sample and is received by the detector of, 323 Model Hitachi Autorecording Spectrophotometer (produced by Hitachi Seisakusho), for example, and further determining the Y value of the three stimulus values of color from the measured spectral transmittance and calculating from the following formula;

$$T = Y/Yo \times 100 \quad (1)$$

T; linear transmittance

Y; Y value of sample

Yo; Y value of blank.

Accordingly, the linear transmittance as mentioned in the present invention is for linear light, and it is different from the method for evaluating transparency by diffused light such as diffusion transmittance (transmittance is determined including diffused light by providing an integrating sphere behind the sample) or opacity (white and black backing are applied on the back of sample and determined from the ratio thereof), etc.

What becomes the problem in instruments utilizing optical techniques is behavior of linear light, and therefore determination of linear transmittance of the recording medium is particularly important in evaluating transparency of the recording material to be used in those instruments.

For example, when observing a projected image by OHP, in order to obtain an image which is clear and easily viewed with high contrast between the recorded portion and the non-recorded portion, it is demanded that the non-recorded portion in the projected image should be bright, namely the linear transmittance of the recording medium should be at a certain level or higher. In the test by the test chart in OHP, in order to obtain the image suitable for the above purpose, the linear transmittance of the recording medium is required to be 2% or higher, preferably 10% or higher for obtaining a more clear projected image. Accordingly, the recording medium suitable for this purpose is required to have a linear transmittance of 10% or higher.

The gloss as mentioned in the present invention is required to have a 45° specular gloss based on JIS Z 8741 of 30% or higher.

According to the method of the present invention as described above, in practicing recording with an aqueous ink, the porous recording surface excellent ink absorptivity to the recording medium, whereby the aqueous ink is dried within a short time after recording. Thus, contamination of hands or disturbance of images will never occur when recorded images are touched with a part of the device or hands during recording or after recording, so that high speed recording is possible.

Further, due to the porocity, the ink transporting layer is not necessarily required to be formed of a water-soluble or highly hydrophilic polymer, but it can be also freely formed of a hydrophobic polymer having high water resistance, and therefore it will not be tackified on the surface under highly humid conditions or with attachment of water droplets, thus exhibiting high water resistance and anti-blocking property.

By the transparentizing treatment after recording, transparency and/or surface gloss are made high, and therefore recorded images excellent in color and clearness can be given. In such image recording, the peeling-off at the interface of the layers will not occur in any case because an ink retaining layer formed between the ink transporting layer and the substrate has excellent ink absorptivity as well as excellent adhesivity both to the ink transporting layer and to the substrate. Further, the recorded image according to the present invention exhibits high water-resistance and high light-resistance as well as excellent storability because the dye forming the image is incorporated into the transporting layer and little portion of the dye is exposed on the surface.

Accordingly, by the image forming method of the present invention, it is possible to provide recorded images with transparency and/or gloss having various aptitudes which are further excellent as compared with the prior art, which are useful for observation by projection of the recorded images onto a screen, etc., by an optical instrument such as slide, OHP, etc., color resolution plates during preparation of positive plates for color printing, or CMF, etc., to be used for color display such as liquid crystal, etc.

According to the present invention, it is possible to form an image by transmitted light excellent in high light transmittance or a surface image having excellent surface gloss.

The present invention is described in more detail by referring to the following Example, in which parts are based on weight.

EXAMPLE 1

By use of a polyethyleneterephthalate film (thickness 100 μm, produced by Toray K.K.) as a light-transmissive substrate, the Composition A shown below was coated on the substrate by a bar coater to a dried film thickness of 7μm, followed by drying in a drying furnace at 120° C. for 5 minutes.

| Composition A | |
|---|---|
| Polyvinylpyrrolidone (PVP K-90, produced by GAF) <10% solution in DMF> | 80 parts |
| Novolac type phenol resin (Resitop PSK-2320, produced by Gunei Kagaku) <10% solution in DMF> | 20 parts |

Further, on the coating the Composition B shown below was coated by a bar coater to a dried film thickness of 12 μm, followed by drying in a drying furnace at 80° C. for 10 minutes.

| Composition B | |
|---|---|
| Thermoplastic elastomer resin emulsion (Chemipearl A-100, Mitsui Sekiyu Kagaku Kogyo K.K., solid content: 40%) | 100 parts |
| Ionomer resin emulsion (Chemipearl S-111, produced by Mitsui Sekiyu Kagaku Kogyo K.K., solid content: 40%) | 10 parts |
| Surfactant (Emulgen 810, produced by Kao K.K.) | 0.2 parts |

The recording medium thus obtained was white and opaque.

On the recording medium, ink jet recording was practiced by use of a recording device having an on-demand type ink jet recording head which generates the bubbles by means of a heat-generating resistor and discharging the recording liquid by that pressure using the four kinds of ink as shown in Table 1 below. Then, transparentizing of the surface layer was performed by heating treatment at 140° C. for 1 minute.

The light-transmissive printed matter thus obtained was subjected to the tests according to the methods shown below for evaluation whether it is fitted for the object of the present invention.

(1) Ink absorptivity was measured by leaving the printed matter after ink jet recording to stand under room temperature, and measurng the time before sufficient drying and fixing when ink does not transfer the finger when the recorded portion is touched with a finger.

(2) The transmitted light image density (O.D.) after transparentizing treatment was measured for the black ink recorded portion by use of Macbeth transmission densitomer TD-504.

(3) Linear transmittance at the non-recorded portion after transparentizing treatment was measured by the spectral transmittance by use of UV-200 spectrophotometer (produced by Shimazu Seisakusho) with the distance from the sample to the window in the light-receiving side being maintained at about 9 cm and determining from the formula (1).

(4) Test for adhesion between the substrate and the ink retaining layer (ink absorbing layer) at the image portion after transparentizing treatment was conducted for the recorded portion made with black ink, by rubbing the recorded portion for ten times with a plastic erasing rubber, and no occurrence of peel-off between the ink retaining layer (ink absorbing layer) and the substrate was rated as , and occurrence of peel-off as x.

(5) Resolution of the recorded image was evaluated by projecting the printed matter by OHP onto a screen according to the following standards with visual observation.

: lines with pitch width of 0.2 mm and thickness of 0.1 mm being clearly discriminable Δ: lines with pitch width of 0.2 mm and thickness of 0.1 mm being not clearly discriminable x: lines with pitch width of 0.5 mm and thickness of 0.3 mm being not clearly discriminable.

Further, from the above results, overall evaluation was performed. The results are shown in Table 2.

In the overall evaluation, those which are unsatisfactory in one or more of the above evaluation items were rated as x.

TABLE 1

| Yellow ink (composition) | |
|---|---|
| C.I. Direct Yellow 86 | 2 parts |
| N—methyl-2-pyrrolidone | 10 parts |
| Diethylene glycol | 20 parts |
| Polyethylene glycol #200 | 15 parts |

TABLE 1-continued

| | |
|---|---|
| Water | 55 parts |
| Magenta ink (composition) | |
| C.I. Acid Red 35 | 2 parts |
| N—methyl-2-pyrrolidone | 10 parts |
| Diethylene glycol | 20 parts |
| Polyethylene glycol #200 | 15 parts |
| Water | 55 parts |
| Cyan ink (composition) | |
| C.I. Direct Blue 86 | 2 parts |
| N—methyl-2-pyrrolidone | 10 parts |
| Diethylene glycol | 20 parts |
| Polyethylene glycol #200 | 15 parts |
| Water | 55 parts |
| Black ink (composition) | |
| C.I. Food Black 2 | 2 parts |
| N—methyl-2-pyrrolidone | 10 parts |
| Diethylene glycol | 20 parts |
| Polyethylene glycol #200 | 15 parts |
| Water | 55 parts |

EXAMPLE 2

As the light-transmissive substrate, the polyethyleneterephthalate film used in Example 1 was used and the Composition C shown below was coated on the substrate by a bar coater to a dried film thickness of 5 μm followed by drying in a drying furnace at 110° C. for 10 minutes.

| Composition C | |
|---|---|
| Polyvinylpyrrolidone (PVPK-90, produced by GAF) <10% solution in DMF> | 85 parts |
| Styrene-acrylic acid copolymer (Oxylac SH-2100, produced by Nippon Shokubai Kagaku) <10% solution in DMF> | 15 parts |

Further on the coating, the Composition D shown below was coated by a bar coater to a dried film thickness of 20 μm, followed by drying in a drying furnace at 80° C. for 10 minutes.

| Composition D | |
|---|---|
| Acrylic-styrene copolymer emulsion (Boncoat 4001, produced by Dainippon Ink Kagaku Kogyo K.K., solid content: 50%) | 100 parts |
| Solvent-soluble acrylic resin powder (Dianal LX, produced by Mitsubishi Rayon K.K.) | 50 parts |
| Surfactant (Pelex OT-P, produced by Kao K.K., solid content: 70%) | 0.15 parts |
| Water | 100 parts |

The recording medium thus obtained was white and opaque. On the recording medium, ink jet recording was practiced similarly as in Example 1.

After recording, the recording medium was immersed in the treating solution comprising the composition shown below for 1 to 2 minutes, followed by drying at room temperature, whereby the resin powder formed a transparent coating to give a printed matter excellent in light transmittance.

| Treating solvent composition | |
|---|---|
| Xylene | 80 parts |
| Methyl ethyl ketone | 20 parts |

Also, the recording medium was evaluated according to the methods as shown in Example 1. The results are shown in Table 2.

EXAMPLE 3

As the light-transmissive substrate, the polyethyleneterephthalate film as used in Example 1 was used, and on the substrate was coated by a bar coater the Composition E shown below to a dried film thickness of 10 μm, followed by drying in a drying furnace at 100° C. for 12 minutes.

| Composition E | |
|---|---|
| Comb type polymer* (produced by Soken Kagaku) <25% solution in methyl cellosolve> | 70 parts |
| Methylvinyl ether/maleic anhydride monoethyl ester copolymer (Gantrez ES-425, produced by GAF) <10% water/ethanol solution> | 30 parts |

*Graft copolymer having 20 parts of MMA macromer graft-polymerized onto 80 parts of the main chain (copolymer of 64 parts of 2-hydroxyethyl methacrylate and 16 parts of dimethylacrylamide)

Further on the coating, the Composition F shown below was coated by a bar coater to a dried film thickness of 10 μm, followed by drying in a drying furnace at 110° C. for 10 minutes.

| Composition F | |
|---|---|
| Styrene resin emulsion (Latex L-8801, produced by Asahi Kasei K.K., solid content: 50%) | 100 parts |
| Ionomer resin emulsion (Chemipearl SA-100, produced by Mitsui Sekiyu Kagaku Kogyo K.K., solid content: 35%) | 10 parts |
| Surfactant (Emulgen A-500, produced by Kao K.K.) | 0.2 parts |
| Microcapsule (containing DOP, produced by Nippon Capsule products, solid content: 19%) | 50 parts |

The recording medium thus obtained was white and opaque. On the recording medium, ink jet recording was practiced similarly as in Example 1.

After recording, the recorded image was pressed by fixing roller (conveying speed 9.5 mm/sec, roller line pressure 40 Kg/cm to give a light-transmissive printed matter.

According to the method of Example 1, the printed matter obtained was evaluated. The results are shown in Table 2.

EXAMPLE 4

As the light-transmissive substrate, the polyethyleneterephthalate film as used in Example 1 was used, and on the substrate was coated the Composition G shown below to a dried film thickness of 8 μm by bar coater, followed by drying in a drying furnace at 120° C. for 5 minutes.

| Composition G | |
|---|---|
| Polyvinylpyrrolidone (PVP K-90; produced by GAF) <10% solution in DMF> | 85 parts |
| Novolac type phenol resin (Resitop SPK-2320; produced by Gunei Kagaku) <10% solution in DMF> | 15 parts |

Further on the coating as coated the Composition H shown below to a dried film thickness of 20 $\mu m$ by a bar coater, followed by drying in a drying furnace at 90° C. for 10 minutes.

| Composition H | |
|---|---|
| Styrene acrylic copolymer resin emulsion (Boncoat PP-1000; produced by Dainippon Ink Kagaku Kogyo, solid content: 45%) | 100 parts |
| Polyvinyl alcohol (PVA-117; produced by Kuraray, 10% aqueous solution) | 50 parts |
| Surfactant (Pelex OT-P; produced by Kao K.K., solid content: 70%) | 0.15 parts |

The recording medium thus obtained was white and opaque.

On the recording medium, ink jet recording was practiced similarly as in Example 1. After recording, the recorded product was treated by use of heating and pressurization in combination by means of fixing rollers (conveying speed 9.5 mm/sec, roller line pressure 40 Kg/cm, roller temperature 150° C.) to give a light-transmissive printed matter.

The printed matter, evaluated in the same manner as in Example 1. The results are shown in Table 2.

COMPARATIVE EXAMPLE 1

A light-transmissive printed matter was obtained in entirely the same manner as in Example 1 except that no Composition A was coated, but only the Composition B from which the surfactant was removed was coated on the substrate. The evaluation results are shown in Table 2.

COMPARATIVE EXAMPLE 2

A light-transmissive printed matter was obtained in entirely the same manner as in Example 2 except that no Composition C was coated, but only the Composition D from which the surfactant was removed was coated on the substrate. The evaluation results are shown in Table 2.

COMPARATIVE EXAMPLE 3

A light-transmissive printed matter was obtained in entirely the same manner as in Example A except that no Composition E was coated, but only the Composition F from which the surfactant was removed was coated on the substrate. The evaluation results are shown in Table 2.

COMPARATIVE EXAMPLE 4

A light-transmissive printed matter was obtained in entirely the same manner as in Example 4 except that no Composition G was coated, but only the Composition H from which the surfactant was removed was coated on the substrate. The evaluation results are shown in Table 2.

TABLE 2

| | Ink absorptivity | Transmitted light image density | Linear transmittance | Adhesion | Resolution | Overall evaluation |
|---|---|---|---|---|---|---|
| Example | | | | | | |
| 1 | 1 sec. | 1.02 | 70% | o | o | o |
| 2 | 1 sec. | 0.87 | 40% | o | o | o |
| 3 | 5 sec. | 0.95 | 72% | o | o | o |
| 4 | 3 sec. | 1.00 | 75% | o | o | o |
| Comparative Example | | | | | | |
| 1 | 30 sec. | 0.85 | 70% | x | x | x |
| 2 | 1 sec. | 0.80 | 40% | x | Δ | x |
| 3 | 5 sec. | 0.90 | 72% | x | Δ | x |
| 4 | 3 sec. | 0.88 | 75% | x | Δ | x |

EXAMPLE 5

By use of a white and opaque polyethyleneterephthalate film (melinex, produced by ICI) as the substrate, the Composition I shown below was coated on the substrate to a dried film thickness of 10 $\mu m$ by a bar coater, followed by drying in a drying furnace at 140° C. for 10 minutes.

| Composition I | |
|---|---|
| Cation-modified polyvinyl alcohol (PVA-C-318-2A, produced by Kuraray) 10% aqueous solution | 50 parts |
| Water-soluble polyester type polyurethane (Elastron E-37, produced by Daiichi Kogyo Seiyaku) 25% aqueous solution | 2.5 parts |
| Catalyst (Elastron Catalyst 32, produced by Daiichi Kogyo Seiyaku) | 0.2 parts |

Further, on the coating was coated the Composition J shown below to a dried film thickness of 15 $\mu m$ by a bar coater, followed by drying in a drying furnace at 90° C. for 5 minutes.

| Composition J | |
|---|---|
| Polyethylene wax (Chemipearl W-300, produced by Mitsui Sekiyu Kagaku Kogyo, solid content: 40%) | 100 parts |
| Polyvinyl acetate emulsion (Polysol 2N-S, produced by Showa Kobunshi, solid content: 51%) | 8 parts |
| Polyoxyethyleneoctylphenyl ether (Emulgen 810, produced by Kao K.K.) | 0.2 parts |

The recording medium thus obtained was white and opaque.

For the recording medium, by using the four kinds of ink shown below, a multi-color full color image was formed by means of a recording device having an on-demand type ink jet recording head which generates bubbles by a heat-generating resistor and discharging ink by that pressure.

After recording, the clarifying treatment of the ink transporting layer was practiced by heating under pressure by means of hot rolls heated to 110° C. to give the multi-color full color image by the present invention.

| | |
|---|---|
| Yellow ink | |
| C.I. Acid Yellow 23 | 2 parts |
| Diethylene glycol | 15 parts |
| Water | 85 parts |
| Magenta ink | |
| C.I. Acid Red 92 | 2 parts |
| Diethylene glycol | 15 parts |
| Water | 85 parts |
| Cyan ink | |
| C.I. Direct Blue 86 | 2 parts |
| Diethylene glycol | 15 parts |
| Water | 85 parts |
| Black ink | |
| C.I. Direct Black 19 | 2 parts |
| Diethylene glycol | 15 parts |
| Water | 85 parts |

The recorded product thus obtained, were tested according to the methods shown below to investigate whether it was sufficiently suited for the object of the present invention. The evaluation results are shown below in Table 3.

(6) Image optical density (O.D.) was measured for the black ink recorded portion from the ink transporting layer side by use of a Macbeth densitometer TR524.

(7) The color clearness of the image was evaluated by visual observation of the recorded image from the ink transporting layer side. Evaluation was conducted at four ranks with the most excellent one being ◎, and subsequently o, Δ and x.

(8) Water resistance of the image was measured by immersing the recording medium in water for 5 minutes, and when the image optical density on the side for image observation was lower than that before immersion, it was rated as x, when the dot diameter became 1.5-fold or more compared with that before immersion, it was rated as Δ, and that which correspond to neither x nor Δwas rates as O.

(9) Gloss was measured and evaluated from the 45° specular gloss on the ink transporting layer surface based on JIS Z 8741.

From the above results, overall evaluation was made. The results are shown in Table 3.

EXAMPLE 6

By using pure paper [Ginwa (trade mark), produced by Sanyo Kokusaku Pulp K.K.] as the substrate, Composition C of Example 2 was coated on the surface of this substrate to a dried film thickness of 8 μm by a bar coater, followed by drying in a drying furnace at 110° C. for 10 minutes.

Further, on the coating the Composition K shown below was coated to a dried film thickness of 20 μm by a bar coater, followed by drying in a drying furnace at 60° C. for 10 minutes.

| Composition K | |
|---|---|
| Ethylene-vinyl acetate copolymer resin emulsion (Chemipearl V-200, produced by Mitsui Sekiyu Kagaku Kogyo, solid content: 40%) | 100 parts |
| Polyurethane emulsion (Aizelax S-4040N, produced by Hodogaya Kagaku Kogyo, solid content: 45%) | 10 parts |
| Sodium dioctyl sulfosuccinate (Pelex OT-P, produced by Kao K.K., solid content: 70%) | 0.15 parts |

The recording medium thus obtained was white and opaque.

For this recording medium, a full color image was formed in the same manner as in Example 5. Subsequently, the clarifying treatment of the ink transporting layer was conducted by a far infrared ray heater at a temperature of about 100° to 110° C.

The recorded product obtained was evaluated similarly as in Example 5. The results are shown in Table 3.

EXAMPLE 7

By use of a glossy paper (SA Kinfuji Supermart, produced by Kanzaki Seishi K.K.) as the substrate, the Composition L shown below was coated on the substrate to a dried film thickness of 10 μm by a bar coater, followed by drying in a drying furnace at 100° C. for 12 minutes.

| Composition L | |
|---|---|
| Comb type polymer 25% methylcellosolve solution | 60 parts |
| Methylvinyl ether/maleic anhydride monoethyl ester (Gantrez ES-425, produced by GAF) 10% water/ethanol solution | 40 parts |

Further on the coating, the Composition M shown below was coated to a dried film thickness of 10 μm by a bar coater, followed by drying in a drying furnace at 140° C. for 3 minutes.

| Composition M | |
|---|---|
| Elastomer emulsion (Chemipearl A-100, produced by Mitsui Sekiyu Kagaku Kogyo, Solid Content: 40%) | 100 parts |
| Ionomer resin emulsion (Chemipearl SA-100, produced by Mitsui Sekiyu Kagaku, solid content: 35%) | 10 parts |
| Polyoxyethylene (Emulgen A-500, produced by Kao K.K.) | 0.2 parts |

The recording medium thus obtained was white and opaque.

For this recording medium, a full color image was formed similarly as in Example 5, and then a UV-ray-curable acrylic paint was coated on the ink transporting layer at a proportion of 3 g/m$^2$, followed by curing. The recorded product obtained was evaluated similarly as in Example 5. The results are shown in Table 3.

COMPARATIVE EXAMPLE 5

Image formation and transparentizing treatment were conducted in the same manner as in Example 5 except for using a recording medium in which formation of ink retaining layer was omitted, and the recorded product was evaluated. The results are shown in Table 3.

COMPARATIVE EXAMPLE 6

Image formation and transparentizing treatment were conducted in the same manner as in Example 6 except for using a recording medium in which formation of ink retaining layer was omitted, and the recorded product was evaluated. The results are shown in Table 3.

TABLE 3

| | Example | | | Comparative Example | |
|---|---|---|---|---|---|
| | 5 | 6 | 7 | 5 | 6 |
| Image Optical density | 1.35 | 1.33 | 1.36 | 1.33 | 1.31 |
| Color clearness | ◎ | ◎ | ◎ | x | x |
| Water resistance | o | o | o | o | o |
| Gloss | 93.5 | 88.7 | 90.3 | 93.5 | 88.7 |
| Overall | o | o | o | x | x |

TABLE 3-continued

| | Example | | | Comparative Example | |
|---|---|---|---|---|---|
| | 5 | 6 | 7 | 5 | 6 |
| evaluation | | | | | |

We claim:

1. A method for forming an image, comprising a step of applying a ink to a recording medium having a light-transmissive ink retaining layer and a light-diffusing ink transporting layer on a substrate to form an image through said ink transporting layer in said ink retaining layer, and a step of transparentizing said ink transporting layer.

2. A method for forming an image according to claim 1, wherein ink is applied by an ink jet recording process.

3. A method for forming an image according to claim 1, wherein the transparentizing treatment is carried out by employing at least one of heating means, pressurizing means, and a solvent for a plasticizer.

4. A method for forming an image according to claim 1, wherein said ink transporting layer is porous.

5. A method for forming an image according to claim 1, wherein said ink transporting layer comprises a thermoplastic resin.

6. A method for forming an image according to claim 1, wherein said ink transporting layer contains particles and a binder which are not dyeable with a dye.

7. A method for forming an image according to claim 1, wherein the ink transporting layer has communicating pores or cracks therein.

8. A method for forming an image according to claim 1, wherein said ink retaining layer is non-porous.

9. A method for forming an image according to claim 1, wherein said ink retaining layer comprises a water-soluble or hydrophilic polymer as a main component.

10. A method for forming an image according to claim 1, wherein the ink retaining layer comprises a water-insoluble polymer as a main component.

11. A method for forming an image according to claim 1, wherein the ink transporting layer has a thickness within the range of from 1 to 400 μm.

12. A method for forming an image according to claim 1, wherein the ink retaining layer has a thickness within the range of from 1 to 200 μm.

13. A method for forming an image for observation by transmitted light, comprising a step of applying ink to a recording medium having a light-transmissive ink retaining layer and a light-diffusing ink transporting layer on a light-transmissive substrate to form an image through said ink transporting layer in said ink retaining layer, and a step of transparentizing said ink transporting layer to a linear light transmissivity of 2% or more.

14. A method for forming an image according to claim 13, wherein ink is applied by an ink jet recording process.

15. A method for forming an image according to claim 13, wherein the transparentizing treatment is carried out by employing at least one of either heating means, pressurizing means, and a solvent for a plasticizer.

16. A method for forming an image according to claim 13, wherein said ink transporting layer is porous.

17. A method for forming an image according to claim 13, wherein said ink transporting layer comprises a thermoplastic resin.

18. A method for forming an image according to claim 13, wherein said ink transporting layer contains particles and a binder which are not dyeable with a dye.

19. A method for forming an image according to claim 13, wherein the ink transporting layer has communicating pores or cracks therein.

20. A method for forming an image according to claim 13, wherein said ink retaining layer is nonporous.

21. A method for forming an image according to claim 13, wherein said ink retaining layer comprises a water-soluble or hydrophilic polymer as a main component.

22. A method for forming an image according to claim 13, wherein the ink retaining layer comprises a water-insoluble polymer as a main component.

23. A method for forming an image according to claim 13, wherein the ink transporting layer has a thickness within the range of from 1 to 400 μm.

24. A method for forming an image according to claim 13, wherein the ink retaining layer has a thickness within the range of from 1 to 200 μm.

25. A method for forming an image having surface gloss, comprising a step of applying ink to a recording medium having a light-transmissive ink retaining layer and a light-diffusing ink transporting layer on an opaque substrate to form an image through said ink transporting layer in said ink retaining layer, and a step of transparentizing said transporting layer to give a 45° specular gloss of the surface of the image according to JIS Z8741 of 30% or higher.

26. A method for forming an image according to claim 25, wherein ink is applied by an ink jet recording process.

27. A method for forming an image according to claim 25, wherein the transparentizing treatment is carried out by employing at least one of heating means, pressurizing means, and a solvent for a plasticizer.

28. A method for forming an image according to claim 25, wherein said ink transporting layer is porous.

29. A method for forming an image according to claim 25, wherein said ink transporting layer comprises a thermoplastic resin.

30. A method for forming an image according to claim 25, wherein said ink transporting layer contains particles and a binder which are not dyeable with a dye.

31. A method for forming an image according to claim 25, wherein the ink transporting layer has communicating pores or cracks therein.

32. A method for forming an image according to claim 25, wherein said ink retaining layer is nonporous.

33. A method for forming an image according to claim 25, wherein said ink retaining layer comprises a water-soluble or hydrophilic polymer as a main component.

34. A method for forming an image according to claim 25, wherein the ink retaining layer comprises a water-insoluble polymer as a main component.

35. A method for forming an image according to claim 25, wherein the ink transporting layer has a thickness within the range of from 1 to 400 μm.

36. A method for forming an image according to claim 25, wherein the ink retaining layer has a thickness within the range of from 1 to 200 μm.

37. A method forming an image according to claim 13, comprising a step of transparentizing said recording medium to a linear transmissivity of 10% or more.

38. A recording medium for forming an image having surface gloss comprising a light-transmissive ink retaining layer and a light-diffusive ink transporting layer provided on an opaque substrate.

39. A recording medium according to claim 38, wherein said ink transporting layer is porous.

40. A recording medium according to claim 38, wherein said ink transporting layer comprises a thermoplastic resin.

41. A recording medium according to claim 38, wherein said ink transporting layer contains particles and a binder which are not dyeable with a dye.

42. A recording medium according to a claim 38, wherein the ink transporting layer has communicating pores or cracks therein.

43. A recording medium according to claim 38, wherein said ink retaining layer is non-porous.

44. A recording medium according to claim 38, wherein said ink retaining layer comprises a water-soluble or hydrophilic polymer as a main component.

45. A recording medium according to claim 38, wherein the ink retaining layer comprises a water-insoluble polymer as a main component.

46. A recording medium according to claim 38, wherein the ink transporting layer has a thickness within the range of from 1 to 400 $\mu$m.

47. A recording medium according to claim 38, wherein the ink retaining layer has a thickness within the range of from 1 to 200 $\mu$m.

48. A recording medium according to claim 38, wherein the ink retaining layer has a higher absorbing power than the ink transporting layer.

49. A recording medium according to claim 38, wherein the weight ratio of said particles to said binder constituting the ink transporting layer ranges between 1/5 and 50/1.

50. A recording medium according to claim 38, wherein the weight ratio of said particles to said binder constituting the ink transporting layer ranges between 3/1 and 20/1.

51. A recording medium according to claim 38, wherein said substrate is an opaque resin, paper or converted paper.

* * * * *

UNITED STATES PATENT AND TRADEMARK OFFICE

CERTIFICATE OF CORRECTION

PATENT NO. : 4,832,984

DATED : May 23, 1989

INVENTOR(S) : KENJI HASEGAWA, ET AL.

It is certified that error appears in the above-identified patent and that said Letters Patent is hereby corrected as shown below:

COLUMN 1

Line 55, "porocity" should read --porosity--.
Line 56, "giving," should read --giving--.

COLUMN 2

Line 52, "a" should read --an--.

COLUMN 3

Line 14, "solve" should read --solved--.
Line 15, "subject" should read --subjecting--.

COLUMN 4

Line 32, "substrate" should read --substrates--.
Line 55, "primary" should read --primarily--.
Line 62, "o" should read --of--.

COLUMN 5

Line 54, "in sufficient," should read --insufficient,--.

COLUMN 6

Line 48, "has" should read --have--.

UNITED STATES PATENT AND TRADEMARK OFFICE
CERTIFICATE OF CORRECTION

PATENT NO. : 4,832,984

DATED : May 23, 1989

INVENTOR(S) : KENJI HASEGAWA, ET AL.

It is certified that error appears in the above-identified patent and that said Letters Patent is hereby corrected as shown below:

COLUMN 8

Line 48, "etc." should read --etc.).--.

COLUMN 9

Line 47, "low-" should read --be low- --.

COLUMN 11

Line 66, "transmittance" should read --transmissive--.

COLUMN 12

Line 21, "formula;" should read --formula:--.
Line 60, delete "method of the".

COLUMN 13

Line 1, "porocity," should read --porosity,--.

COLUMN 14

Line 46, "as ," should read --as o,--.
Line 52, " : lines" should read --o: lines--.

COLUMN 16

Line 46, "40 Kg/cm to" should read --40 Kg/cm) to--.

UNITED STATES PATENT AND TRADEMARK OFFICE

CERTIFICATE OF CORRECTION

PATENT NO. : 4,832,984

DATED : May 23, 1989

INVENTOR(S) : KENJI HASEGAWA, ET AL.

It is certified that error appears in the above-identified patent and that said Letters Patent is hereby corrected as shown below:

COLUMN 17

Line 1, "as" should read --was--.
Line 43, "matter," should read --matter was--.
Line 64, "Example A" should read --Example 3--.

COLUMN 18

Line 28, "(melinex," should read --(Melinex,--.

COLUMN 19

Line 36, "correspond" should read --corresponded--.
Line 37, "rates" should read --rated--.
Line 68, Boldface should be deleted.

COLUMN 20

Lines 1-3, Boldface should be deleted.

COLUMN 21

Line 10, "a" (first occurrence) should be deleted.

UNITED STATES PATENT AND TRADEMARK OFFICE
CERTIFICATE OF CORRECTION

PATENT NO. : 4,832,984

DATED : May 23, 1989

INVENTOR(S) : KENJI HASEGAWA, ET AL.

It is certified that error appears in the above-identified patent and that said Letters Patent is hereby corrected as shown below:

COLUMN 22

Line 28, "said transporting layer" should read --said ink transporting layer--.

Line 64, "method forming an image" should read --method for forming an image--.

Signed and Sealed this

Thirty-first Day of December, 1991

Attest:

HARRY F. MANBECK, JR.

*Attesting Officer* *Commissioner of Patents and Trademarks*